Jan. 1, 1924

J. T. F. CONTI 1,479,374

LOW PRESSURE AUTOMATIC GAS CUT-OFF

Filed Jan. 25, 1922

Patented Jan. 1, 1924.

1,479,374

UNITED STATES PATENT OFFICE.

JAMES TIBURCE FELIX CONTI, OF PARIS, FRANCE.

LOW-PRESSURE AUTOMATIC GAS CUT-OFF.

Application filed January 25, 1922. Serial No. 531,724.

*To all whom it may concern:*

Be it known that I, JAMES TIBURCE FELIX CONTI, engineer, citizen of the Republic of France, residing in Paris, France, and whose post-office address is 52 Rue de Clichy, have invented certain new and useful Improvements in Low-Pressure Automatic Gas Cut-Offs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a safety apparatus of the siphon type which is so disposed as to effect the automatic closing of the gas piping wherewith the apparatus is connected, should the pressure in the said piping descend below a stated value which is adjustable as desired. The piping cannot be subsequently opened except by placing the apparatus in the proper working condition. The object of the said apparatus is to prevent accidents which may be caused by the gas, such as explosions or asphyxia, these being due as a general rule to one of the following causes:

1. The gas meter is closed while leaving one of the burners open, thus causing an unobserved leakage when the meter is again opened.

2. The same thing may occur when the temporary closing of the gas is due to repair work on the outer piping or mains or to any other cause.

3. A considerable leakage may occur which will cause the pressure to become reduced in the piping.

In these various cases, the apparatus comes automatically into action and immediately shuts off the piping.

The safety siphon apparatus according to this invention may also be considered as a checking device for leakages. In fact if all the burners being closed, the gas meter of the installaton is closed, the pressure would be still maintained in the piping if it is gas tight.

But in case of leakage, the pressure will be reduced and the apparatus will effect the automatic closing of the piping. However, the controlling of the apparatus can be rendered less accurate if desired either by increasing the volume of gas contained within the installation, or by allowing a certain small leakage at the cock of the gas meter in order to maintain the pressure within the prescribed limits for the gas tight condition of the installation when the gas meter is closed.

The following description, together with the accompanying drawing which is given by way of example, sets forth an embodiment of this invention.

Figure 1:
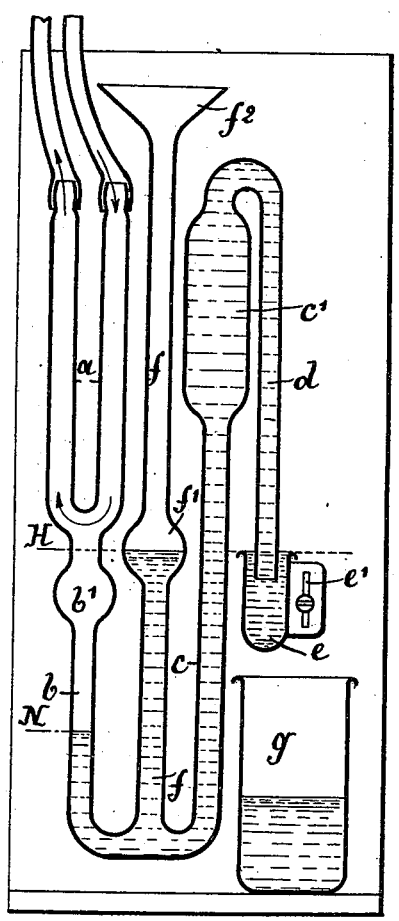
Fig. 1 is a diagrammatic view showing a vertical section of the apparatus in the case where it allows free passage of the gas.

The said apparatus is constituted by the U-tube $a$ which is interposed in the gas piping. At the bottom of the said tube is disposed the vertical tube $b$ having an enlarged portion $b^1$ and communicating with a siphon $c$ $d$ whose upwardly extending branch is also provided with an enlarged portion $c^1$ whilst the downwardly extending branch $d$ is immersed at the lower part in the vessel $e$. The vertical position of the said vessel is adjustable for instance by the slide $e^1$ as shown, or by any other suitable means. A fourth tube $f$ is connected both with the tubes $b$ and $c$, for instance as shown in the drawing, the said tube having an enlarged portion $f^1$ and ending in the funnel $f^2$. A suitable movable receptacle $g$ is so disposed as to receive the overflow from the vessel $e$.

The operation of the apparatus is as follows: The apparatus being partially filled with water or other liquid, as shown in Fig. 1, the gas will flow freely in the U-tube $a$, and the gas pressure will maintain the liquid in the tube $b$ at the level N depending upon the pressure of the gas, with reference to the level H which is established in the tube $f$ at the level of top of the overflow vessel $e$.

Figure 2:
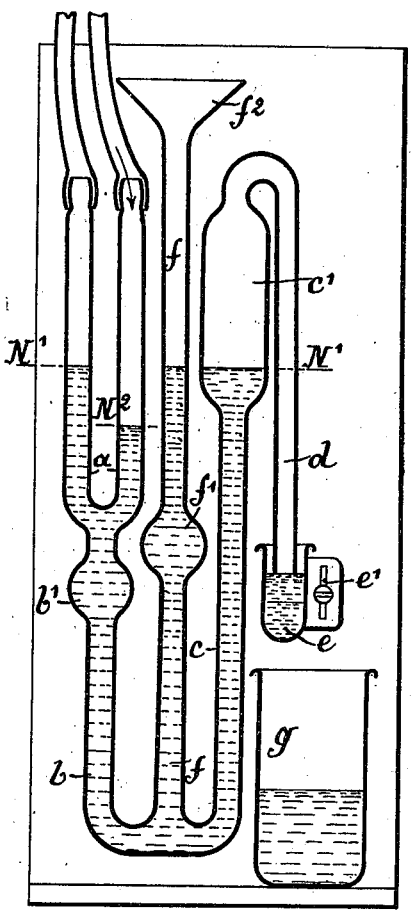
Fig. 2 is a similar view showing the various levels when the flow of gas is cut off by the liquid of the siphon.

Should the gas pressure become reduced for any reason, the difference in the height of the levels N and H will tend to diminish; the liquid will rise in the tube $b$ and will descend at the same time in the tube $f$ and in the vessel $e$, the respective vertical movements depending upon the cross-sections. When the level in the vessel $e$ uncovers the lower aperture of the branch $d$ of the siphon $c$ $d$, the latter will become unprimed, and the liquid of the enlarged portion $c^1$ will rise into the lower part of the U-tube $a$, occupying the place of the gas as far as the levels $N^1$, $N^2$, Fig. 2.

When in this position, if the gas pressure should increase, this will have the effect of separating the levels $N^1$ $N^2$ in the branches of the U-tube but the gas flow will continue to be stopped.

In order to again establish the gas flow and to empty the U-tube, it will be necessary to restore the apparatus to operating conditions by pouring water into the tube $f$ through the funnel $f^2$. This will have the effect of again priming the siphon $c$ $d$ and of thus filling again the vessel $e$. When the latter begins to overflow, the filling operation is observed to be completed, and the liquid will overflow automatically until the level in each of the tubes assumes the original position shown in Fig. 1.

It will be observed that by adjusting the height of the vessel $e$ the value of the reduction of pressure which is required to obtain the automatic closing of the gas piping is determined. The apparatus also provides for the automatic discharge through the overflow of the vessel $e$ of the water of condensation which is brought over in the gas-piping, and the apparatus will thus serve as an automatic draining device. Inasmuch as the same liquid is employed throughout all the operations of the device, a liquid having a stable character may be used, such for instance as vaseline oil.

The apparatus according to the present invention may be constructed in different manners and may receive various applications. It may be used particularly to effect the automatic closing of piping containing liquids of different densities, or for the passage of gases which may be used alone or may contain various substances in suspension.

Having now described and ascertained the nature of my said invention and in what manner the same is to be carried out, I declare that what I claim is:—

1. A safety apparatus for piping used for gaseous fluids, comprising a U-tube interposed in the piping of the gas to be controlled, a siphon leading from the bottom of the said U-tube, liquid contained in the said siphon, a vessel communicating with the downwardly extending discharge branch of the said siphon, and means for effecting the automatic unpriming of the siphon when the gas pressure falls below a stated value.

2. A safety apparatus for piping used for gaseous fluids, comprising a U-tube interposed in the piping of the gas to be controlled, a siphon leading from the bottom of the said U-tube, liquid contained in the said siphon, a vessel having immersed therein the downwardly extending discharge branch of the siphon, and means for effecting the vertical displacement of the said vessel in order to adjust the standard operating pressure of the apparatus.

3. A safety apparatus for piping used for gaseous fluids, comprising a U-tube interposed in the piping of the gas to be controlled, a siphon leading from the bottom of the said U-tube, liquid contained in the said siphon, a vessel having immersed therein the downwardly extending discharge branch of the siphon, means for regulating the vertical position of the said vessel, and a filling branch opening into the atmosphere and ending at the horizontal branch of the siphon.

4. A safety apparatus for piping used for gaseous fluids, comprising a U-tube interposed in the piping of the gas to be controlled, a siphon leading from the bottom of the said U-tube, liquid contained in the said siphon, a vessel having immersed therein the downwardly extending discharge branch of the siphon, a filling branch ending at the horizontal branch of the siphon, and a receptacle for receiving the overflow of the said vessel.

5. A safety apparatus for piping used for gaseous fluids, comprising a U-tube interposed in the piping of the gas to be controlled, a siphon leading from the bottom of the said U-tube, a chamber having a relatively large capacity disposed on the intermediate branch of the siphon, a vessel having immersed therein the downwardly extending branch of the said siphon, and liquid filling the said siphon and the said vessel.

In testimony that I claim the foregoing as my invention, I have signed my name.

JAMES TIBURCE FELIX CONTI.